Jan. 6, 1970     R. A. POWELL ET AL     3,488,041
BLAST FURNACE STOVE Filed March 19, 1968     7 Sheets-Sheet 1

INVENTORS
RUSSELL A. POWELL &
JACK HYDE
BY Sherman H. Barber
their Attorney

INVENTORS
RUSSELL A. POWELL &
JACK HYDE
BY
their Attorney

Jan. 6, 1970   R. A. POWELL ET AL   3,488,041
BLAST FURNACE STOVE

Filed March 19, 1968   7 Sheets-Sheet 7

INVENTORS
RUSSELL A. POWELL &
JACK HYDE
BY Sherman H Barber
their Attorney

United States Patent Office 3,488,041
Patented Jan. 6, 1970

3,488,041
BLAST FURNACE STOVE
Russell A. Powell and Jack Hyde, Pittsburgh, Pa., assignors to Koppers Company, Inc., a corporation of Delaware
Filed Mar. 19, 1968, Ser. No. 714,246
Int. Cl. F23l *9/04, 15/02*
U.S. Cl. 263—19
15 Claims

ABSTRACT OF THE DISCLOSURE

A blast furnace stove in accordance with the invention includes improved girder and grid supports for improved interlocking checker shoes and improved interlocking checkerbricks.

Background of the invention

This invention relates to stoves for use with a blast furnace, and more particularly, to an improved checkerwork brick structure supporting such improved checkerwork brick in a stove.

Conventional stoves of the two-pass type, which is generally preferred, include a side-combustion chamber and a checkerwork chamber wherein a multiplicity of checker bricks are located. In the prior art, there are many types of checker bricks and many arrangements of the checker bricks in stoves. The present invention, however, includes features and advantages not heretofore known in the art which improve the efficiency of the stove and which avoid known deficiencies in the prior art structures.

Summary of the invention

According to the invention, girders that rest on fixed columns support a grid structure in the bottom of a blast furnace stove, and improved checker shoes that rest on the grid structure have lug-type projections that cooperate with and interconnect the grid and checker shoes. New improved checkerbricks of various shapes cooperate with the shoes and interlock with other similar checkerbricks, whereby the interlocking checkerbricks, shoes, and grid structure results in a monolithic-like checker mass.

For a further understanding of the invention and for advantages and features thereof, reference is made to the accompanying detailed description and the drawings referred to therein.

Detailed description

Figures 1, 3, 4:
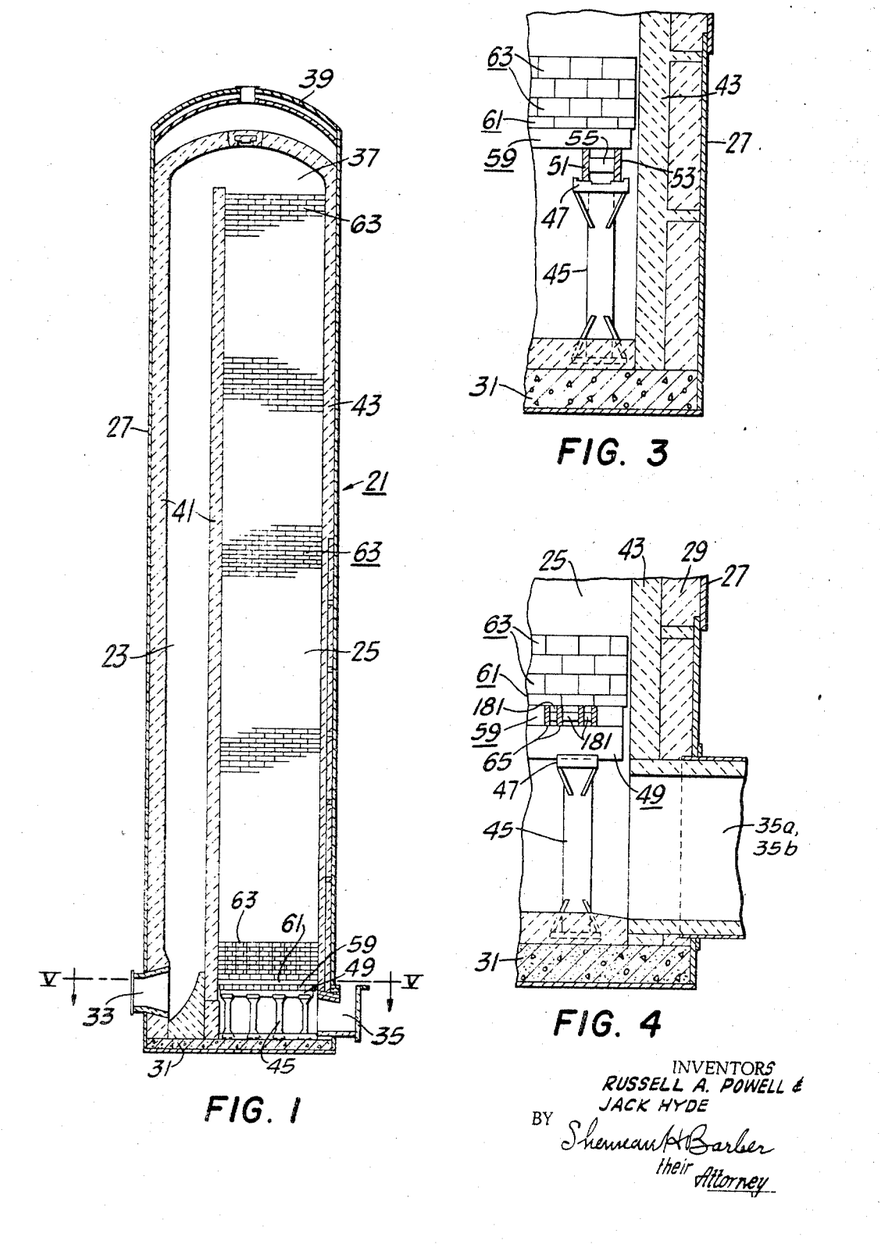
FIG. 1 is a schematic elevational view, in section, of a stove with checkerwork and supports therefor in accordance with the invention.
FIG. 3 is a sectional view along line III—III of FIG. 2.
FIG. 4 is a sectional view along line IV—IV of FIG. 2.

FIG. 1 illustrates a conventional two-pass type of stove 21 having a conventional side combustion chamber 23 and a checkerwork chamber 25. The stove 21 is a generally cylindrical vertical unit having an outer cylindrical steel shell 27, and an inner lining 29 of conventional construction. The stove 21 rests upon a suitable reinforced base 31.

Figure 2:
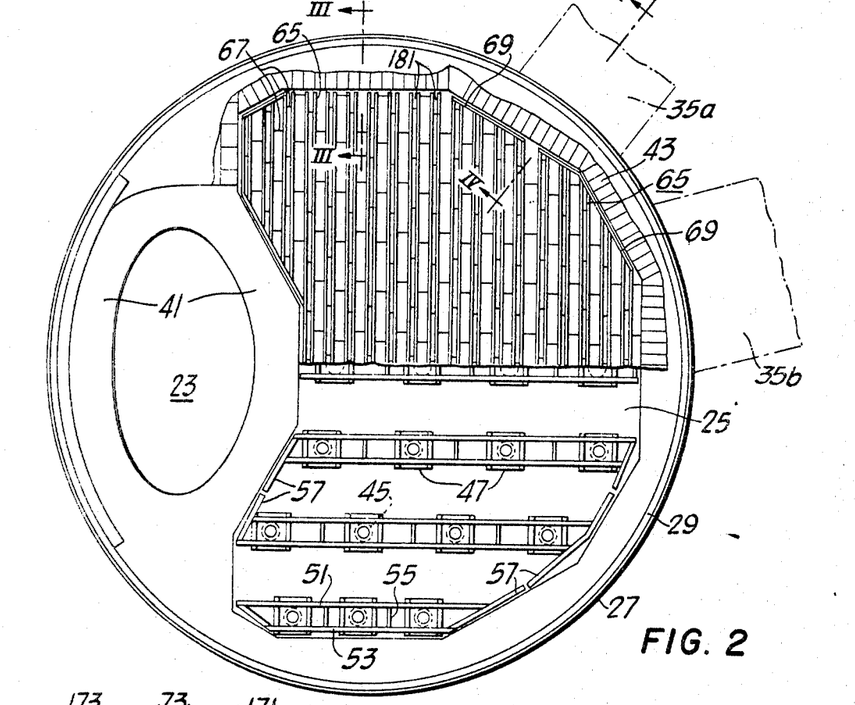
FIG. 2 is a schematic plan view, at an enlarged scale, of the checkerwork support structure, at two closely spaced apart levels.

At the bottom of the combustion chamber 23, there is a burner inlet 33; and at the bottom of the checkerwork chamber 25 there is shown the two usual outlet openings 35a, 35b, leading to the usual chimney valves (FIG. 2). The top of the stove 21 has the usual domed combustion chamber 37 within a domed shell portion 39.

The combustion chamber 23 is formed by a profile wall 41, that extends from the base 31 upward to a level at the bottom of the domed combustion chamber 37, and that merges with a profile wall 43 closely adjacent to the lining 29 on the steel shell 27.

Supporting structure

The mass of checkerwork bricks 63 and metallic checker shoes 61 are supported, within the checkerwork chamber 25 (hereinafter sometimes referred to as the checker chamber 25) and at the bottom thereof, by a grid structure 59, a plurality of girders 49, and a plurality of support columns 45 which are spaced apart and arranged in rows, as shown in FIG. 2.

The base portion of each column 45 is encased or grouted in concrete, and the top of each column is provided with a soleplate 47 (FIGS. 2, 3, 4). The girders 49 are supported on the sole plates and arranged in a generally parallel manner, as shown in FIG. 2. Each girder 49 comprises vertical parallel side plates 51, 53 that are connected together intermittently by other plate members 55. End members 57 are provided and secured to the ends of each girder 49 in such a way that the end members follow the contour of the profile wall 41 of the stove, and that provide support for the ends of the grid structure 59 that rests on the girders 49.

The grid structure 59 cooperates in a manner described hereinafter with metallic shoes 61 that rest on the grid structure, and refractory type checkerwork 63, described hereinafter, are directly supported on the metallic shoes 61. Each grid 59 comprises a plurality of spaced apart, parallel plates 65 set on edge that are interconnected to maintain a grid form by a plurality of other vertical gusset plates 67, disposed normal to the parallel plates 65. The grids 59 are arranged generally across and normal to the longitudinal axes of the girders 49. Further, the members 65, 67 comprising a grid are spaced more closely together than are the girder members 51, 53, 55, so that the individual metallic checker shoes 61 find adequate supporting surface of the grids 59. Like the girders 49, each grid has end vertical plates 69 that interconnect and tie together the several vertical plates 65 comprising each grid 59.

It will be understood by those skilled in the art that only one half the required number of girders 49 appear in the lower portion of FIG. 2, and that only one half the required number of grids 59 appear in the upper portion of FIG. 2. The showing of the supporting structure, at two different levels, in FIG. 2 is for clarification purposes.

The various metallic shoes 61, and the various refractory checker brick 63, in accordance with the invention, are shown in FIGS. 8–23.

Checkerwork

Figure 8:
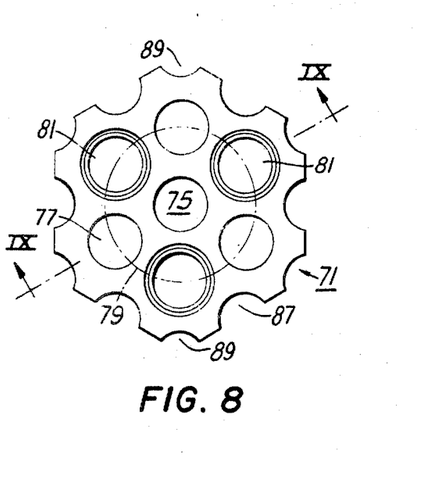
FIG. 8 is a schematic plan view of one of the standard checkerwork bricks in accordance with the invention.
Figure 9:
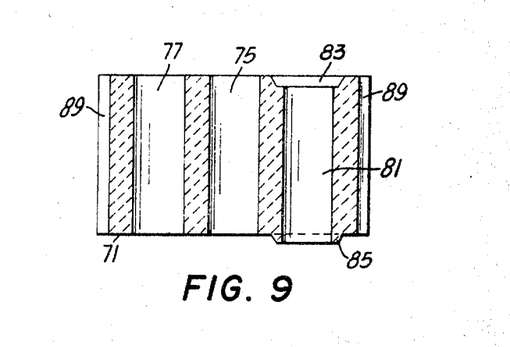
FIG. 9 is a sectional view along line IX—IX of FIG. 8.

FIGS. 8 and 9 illustrate one basic type of checker brick 71 in accordance with the invention, and FIGS. 10–13 illustrate a full metallic shoe 73.

Referring to FIGS. 8 and 9, it will be noted that the checker brick 71 is basically hexagonal in plan view, there being a central axial hole 75, a plurality of first spaced apart holes 77, equiangularly spaced apart on a hole circle 79, and a plurality of second spaced apart holes 81, equiangularly spaced apart and spaced equidistant from adjacent holes 77.

As seen in FIGS. 8 and 9, the holes 75 and 77 are cylindrical but, the holes 81 merge with a recess 83 in the top surface of the checker brick 71, and a downwardly protruding lip 85 is provided on the bottom surface of the checkerbrick, around the perimeter of the hole 81. The lip 85 is complementary to the recess 83; that is to say, the lip 85 of one checker brick is mutually cooperative with the recess 83 in another checker brick when such bricks are stacked in a manner referred to hereinafter.

Figure 6:
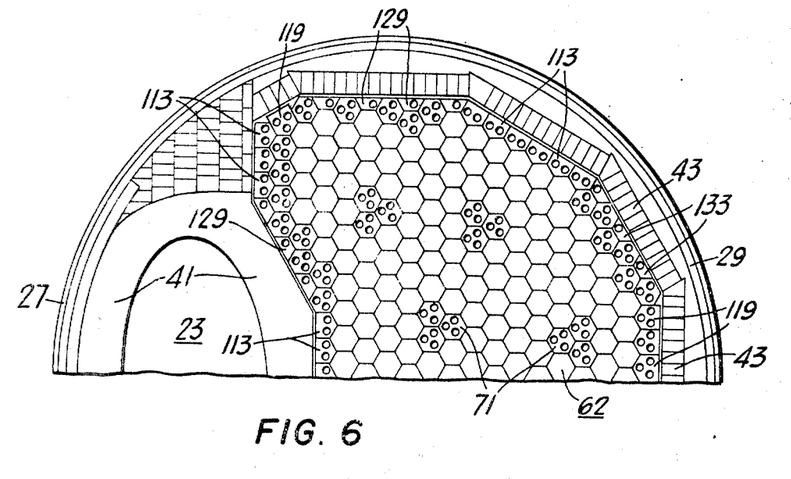
FIG. 6 is a schematic plan view of the checkerwork arrangement in odd numbered courses.

The perimeter of the checker brick 71 is serrated by notches which are portions of circular holes; some of the notches are substantially half-holes 87 while some others, located at the apices of the hexagonal shaped checker brick, are one-third holes 89. It will be apparent then, that when the half-hole notches 87 match corresponding half-hole notches in another contiguous checker brick, in the manner shown in FIG. 6 for example, the two half-holes notches constitute a complete cylindrical hole like holes 75, 77. Likewise, where three checker bricks abut, as shown in FIG. 6 for example, the three one-third hole notches constitute a complete cylindrical hole, like holes 75, 77.

The checker brick 71 is made of refractory material having a suitable composition, and, in the stove 21, there may be other refractory checker bricks shaped like those of FIGS. 8, 9, but which have different compositions depending on the vertical location in the checkerwork mass.

Referring to FIGS. 10–13, it will be noted that the full shoe 73 is basically hexagonal in plan view, there being one cylindrical central axial hole 91 and one similar cylindrical hole 93 situated on a hole circle 95. Diametrically opposite hole 93, on hole circle 95, is another hole 97, and the top surface of the checker brick 73 also has a recess 99 around hole 97, like the recess 83 around hole 81 in checker brick 71.

Figure 10:
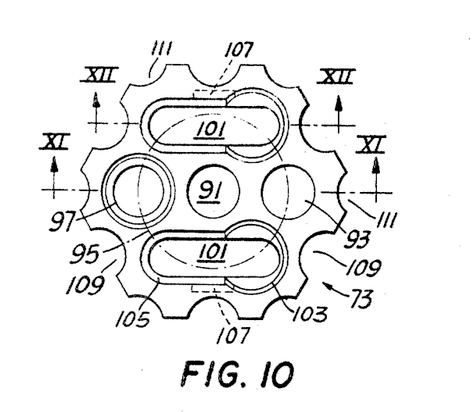
FIG. 10 is a schematic plan view of one of the checker shoes.
Figure 11:
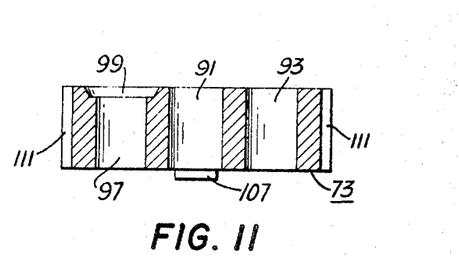
FIG. 11 is a sectional view along line XI—XI of FIG. 10.
Figure 12:
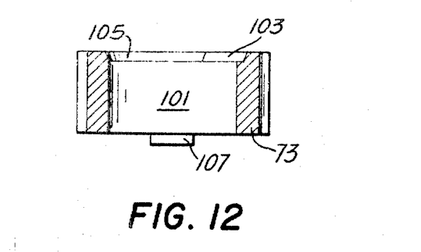
FIG. 12 is a sectional view along line XII-XII of FIG. 10.
Figure 13:
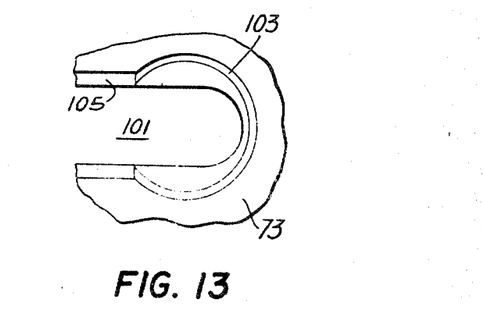
FIG. 13 is a plan view showing a detail of a portion of the checker shoe of FIG. 10.

The full shoe 73 also has two elongate generally parallel oval holes 101 with arcuate ends having longitudinal axes that are parallel to the common diameter of holes 91, 93 and 97. The top surface of the full shoe 73 is recessed as an enlarged circular arc 103 around one end portion of the hole 101, and the recess 103 merges into a chamfer 105 paralleling the remaining upper portion of the hole 101, as shown in FIGS. 10 and 13.

Depending below the bottom surface of the full shoe 73 are two spaced apart parallel lugs 107, which are positioned on opposite sides of the holes 101, where shown in FIG. 10.

Like the checker brick 71, the full shoe 73 also has a serrated perimeter; there being half-hole notches 109 along the flat side of the hexagonal shaped full-shoe 73, and one-third hole notches 111 at the apices of the full shoe. The half-hole notches 109 and the one-third hole notches 111 in the full shoe 73 match with similar partial-hole notches in other full shoe 73, or in shoe portions described hereinafter, to form complete cylindrical holes.

Preferably, the full shoe 73 is made of metal, such as cast alloy steel, but other suitable materials may be used if preferred.

FIGS. 14–20 illustrate other forms of refractory checker bricks, and FIGS. 22–35 illustrate other forms of metallic shoes.

Figure 14:
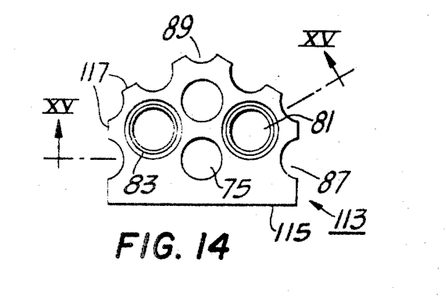
FIGS. 14–21 illustrate other forms of the checker bricks.
Figure 15:
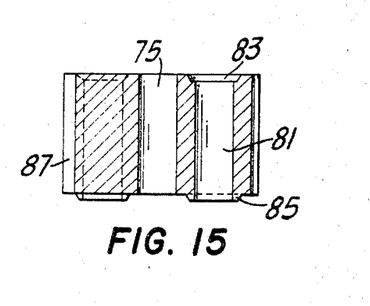

FIGS. 14, 15 illustrate a three quarter checker brick 113 that is generally pentagonal in plan view. The brick 113 has first and second parallel sides that are perpendicular to a third side, and fourth and fifth sides that intersect at an included angle of 120°. Sides one and four and sides two and five also intersect each other at an included angle of 120°.

The brick 113 has a first plain cylindrical hole 75 therethrough centered at the intersection of the bisectors of the angles between sides one and four and two and five. The brick 113 also has a second plain hole 75 on the line bisecting the angle between sides four and five and at the intersection of a hole circle concentric with the first hole 75. At the intersection of the hole circle and the bisectors of the angles between sides one-four and two-five, there are two other holes 81 that merge into a recess portion 83 in the top surface of the three-quarters checker brick 113. Like the full checker brick 71, there is a downwardly projecting lip 85 around the bottom perimeter of each of the holes 81. Further, the lip 85 of one checker brick mates with the recess 83 in another underlying checker brick 63 or shoe 61 when the checker units are stacked in the stove 21.

One side 115 of the checker brick 113 is straight and has no notches. But, each of the sides 117, one, two, four and five, has a half-hole notch 87 therein, and at the apices formed by the intersecting sides one-four, four-five, and two-five, there is a one-third hole notch 89.

Figure 16:
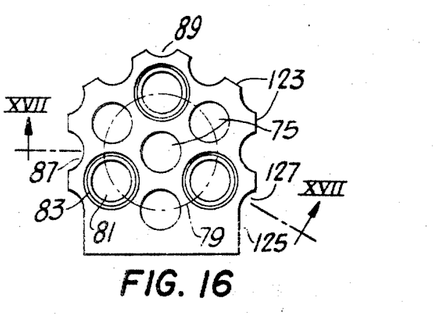
Figure 17:
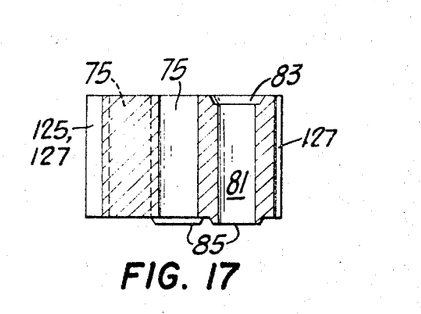

FIGS. 16 and 17 illustrate an edge checker brick 119 which is shaped also in the form of a pentagon, and somewhat like the brick 113. The checker brick 119 has a first cylindrical hole 75 at the same location as the hole 75 in checker brick 113, and three other angularly spaced apart first cylindrical holes 77 arranged on a hole circle 79 concentric with the first cylindrical hole 75. Like the checker 113, the three holes 75 are centered on the angle bisectors between sides one-four four-five, and two-five. Also there are other holes 81, spaced equiangularly between the holes 75 on the hole circle 79, which merge with recesses 83 in the top surface of the checker brick 115. Further, there is a lip 85 on the bottom surface of the brick, surrounding the bottom edge of the holes 81, that mates with the recesses 83 underlying checker bricks and shoes when the checkerwork units are stacked in the stove 21.

One side 121 of the checker 119 is straight and has no notches, but each one of the other four sides 123 has a half-hole notch 87, and, at three apices of the checker brick, three are one-third hole notches 89. The two other sides 123 (sides one and two), that are perpendicular to the straight plain side 121 (side three), have, besides the half-hole notch 87, a rectangular cut-out portion 125 that merges with a one-fourth hole notch 127, about as shown in FIG. 16. Like the checker bricks 71, 113, there is a downwardly projecting lip 85 surrounding the holes 81.

Figure 18:
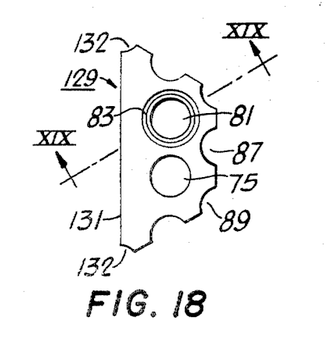
Figure 19:
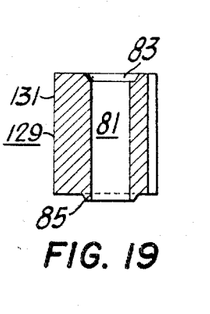

FIGS. 18 and 19 illustrate a right-hand, half-checker brick 129, which is similar to the right-hand half portion of checker brick 71, except that the checker brick 129 does not have any hole notches along the left-hand face 131; there being no half-hole notches corresponding to one-half of the holes 75, 77 and 81 along the vertical centerline of the checker brick 71. The notches 132 at the top and bottom of the brick 129 are one-sixth hole notches (one-half of the one-third hole notches of the brick 71).

Figure 20:
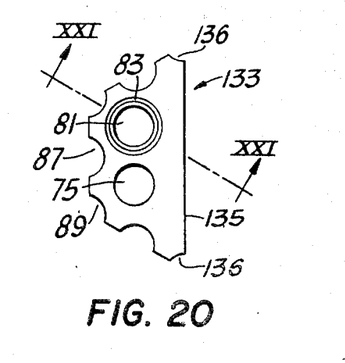
Figure 21:
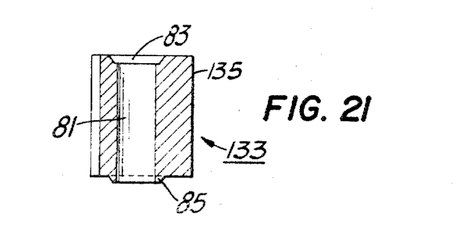

FIGS. 20 and 21 illustrate a left-hand, half-checker brick 133, which is similar to the left-hand half portion of the checker brick 71, except that the left-hand, half-checker brick 133, like the right-hand, half checker brick 121, has no hole notches along one right-hand face 135, and the notches 136 at the upper and lower apices are one-sixth hole notches, instead of one-third hole notches as in brick 71.

The checker bricks 113, 119, 129, and 133 are, like the checker brick 71 made of refractory having a suitable composition for their respective vertical location in the stove 21.

Figure 22:
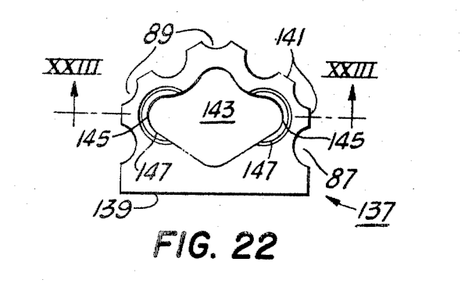
FIGS. 22–35 illustrate the various forms of other checker shoes.
Figure 23:
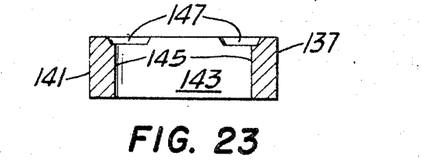

FIGS. 22 and 23 illustrate a three-quarter size metallic shoe 137 having generally a pentagonal shape that is substantiallly the same as the three-quarter size checker brick 113 (FIG. 14). That is, the three-quarter size metallic shoe 137 has one straight, smooth side 139, and four other sides 141 in each of which there is a half-hole notch 87. At the apices formed by the intersection of the other four sides 141, there are one-third hole notches 89. The metallic shoe 137 differs from the checker 113 in the size, shape and arrangement of the holes through the shoe.

The metallic shoe 137 has a single hole 143 therethrough that is shaped about as shown in FIG. 22. The two lateral arcuate portions 145 of the hole 143 merge with recesses 147 in the upper surface of the shoe 13; such recesses being adapted to receive the lips 85 of superimposed refractory checker brick. Like the full shoe 73 the three-quarter size shoe 137 is made, preferably of cast alloy steel, though other suitable materials may be used if preferrred.

Figure 24:
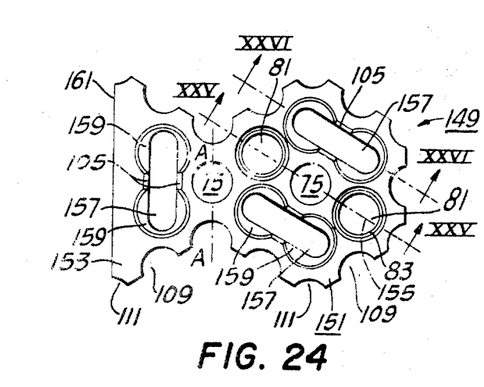
Figure 25:
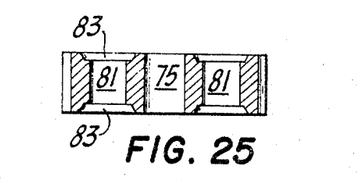
Figure 26:
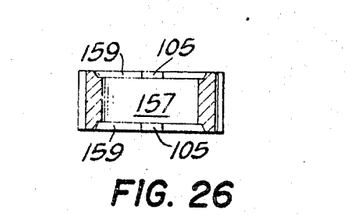

FIGS. 24–26 illustrate one form of a one-and-one-half shoe 149 that is shaped as an eight-sided polygon; the right-hand portion 151, as shown in FIG. 24, is a full hexagonal shaped shoe and the left-hand portion 153 is a one-half of a hexagonal shoe. The full 151 and the half 153 shoe portions are integrally joined along imaginary surfaces designated as line A—A; one imaginary surface is common to the full shoe portion 151 and the other such surfaces to the one-half shoe portion 153.

The right-hand, full shoe portion 151 is perforated by a plurality of holes of varying size and shape: for instance, a plain cylindrical hole 75 is located in the geometrical center of the right-hand portion; a pair of other holes 81 which merge with recesses 83 in both the top and bottom surfaces of the right-hand portions are centered on a diameter 155 through the central hole 75; and a pair of elongated oval holes 157 are arranged parallel to and on opposite sides of the diameter 155. Like the full shoe 73, the one-and-one-half shoe 149 has a chamfer 105 in both the top and bottom surfaces extending along both straight sides of the elongate oval holes 157. Each such hole merges at its rounded ends with recesses 159 in both the top and bottom surfaces of the full shoe portion 151. Each recess 159 is similar to the recess 103 in the full shoe 73 (FIG. 10).

Like the full hexagonal shoe 73 (FIG. 10), the full shoe portion 151 also has hole notches in its outer periphery. Each surface has one-half hole notch 109, and, at the apices of the full shoe portion, there are one-third hole notches 111.

The half-shoe portion 153 has one plain, straight face 161, and each one of the other three sides or surfaces, including the common surface along line A—A, has a half-hole notch 109; one-third hole notches 111 are located at the apices formed by intersecting pairs of the four sides. The half-shoe portion 153 also has an oval hole 157 and two recess portions 159 at the rounded ends of the oval hole, like the oval holes 157 in the full shoe portion 151. However, the axis of the oval hole 157, in the half-shoe portion 153, is parallel to the imaginary surface line A—A mentioned previously. The half-hole notches 109 in each of the imaginary surfaces that abut along line A—A combine to form a single full cylindrical hole 75.

Figure 27:
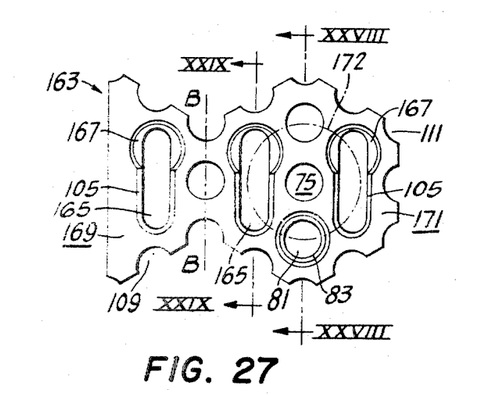
Figure 28:
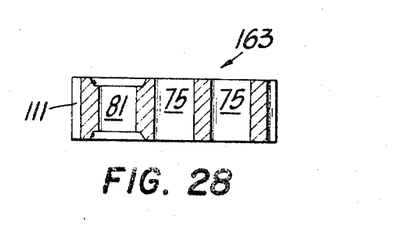
Figure 29:
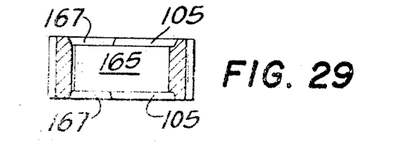

FIGS. 27–29 illustrate another form of a one-and-one-half shoe 163. The periphery of this shoe is similar to the one-and-one-half shoe 149, but the shape and arrangement of the holes in the shoe 163 are different from those in the shoe 149. The shoe 163 has a plurality of oval holes 165 that merge with only top and bottom recesses 167 around one arcuate end of the oval holes 165, and chamfers 105, like those in the full shoe 73, are provided around the remainder of the periphery of the holes 165. Further, the oval holes 165 are parallel to each other and also are parallel to a line B—B, that designates where imaginary surfaces common to both the one-half portion 169 and to the whole portion 171 abut. The whole portion 171 has only one hole 81, but has two holes 75, one of which is in the geometric center of the whole portion 171 and the other of which is situated at the intersection of a hole circle 172 and an extended diameter of the central hole 75.

Figure 30:
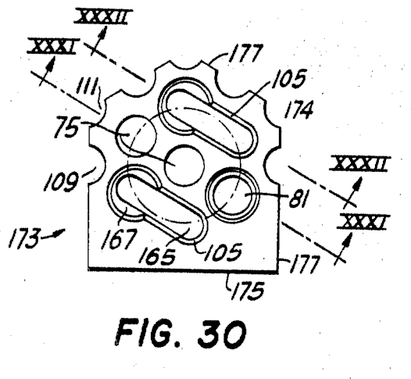
Figure 31:
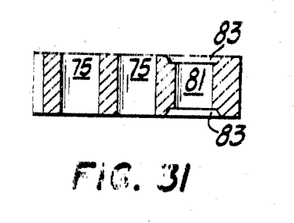
Figure 32:
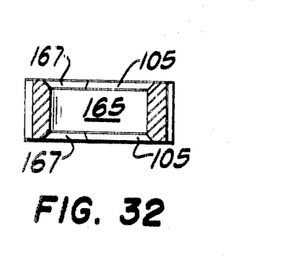

FIGS. 30–32 illustrate one form of edge shoe 173 that is generally pentagonal in shape. The edge shoe 173 has first and second parallel sides that are perpendicular to a third side, and fourth and fifth sides that intersect at an included angle of 120°. Pairs of sides one and four, and sides two and five also intersect each at an included angle of 120°.

The shoe 173 has a first plain cylindrical hole 75 therethrough centered at the intersection of the bisectors of the angles between sides one-four and two-five. Also, the shoe 173 has a second similar cylindrical hole 75 centered at the intersection of hole circle 174 and the bisector of the angle between sides one and four. Another hole 81 with recess 83 is centered at the intersection of the hole circle 174 and the side one-four-angle-bisector; but, hole 81 is on the opposite side of the central first hole 75; that is the hole 81 is positioned 180° from the second hole 75.

Sides one, two, four and five have one-half hole notches 109, and, at the apices formed by intersecting sides one-four, two-five, and four-five, there are one-third hole notches 111.

The shoe 173 also has two oval holes 165 therethrough that are arranged parallel to and on opposite sides of, the bisector of the angle between sides one-four. The center of the circular recess 167 is located on the hole circle 174.

Figure 33:
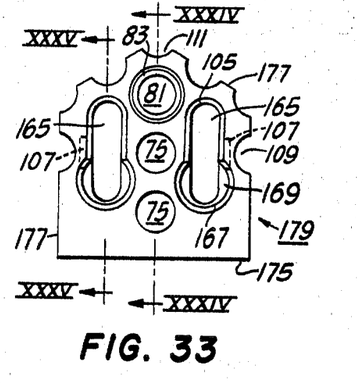
Figure 34:
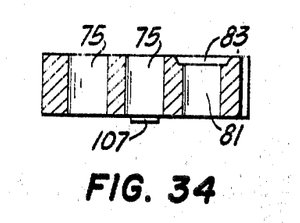
Figure 35:
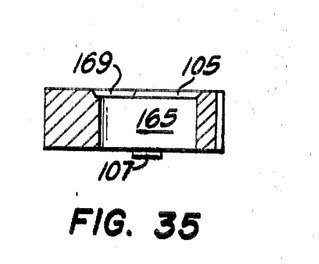

FIGS. 33–35 illustrate another form of edge shoe 179 that is generally similar to the edge shoe 173 except that: the entire arrangement of holes 75, 81, 165 including the recesses and chamfers associated therewith, is rotated through an angle of 120°, in a clockwise direction, from the location of the same holes shown in FIG. 30; and that only the top surface of the edge shoe 179 is recessed and chamfered. However, in addition to the structure shown in FIG. 30, the edge shoe 179 is provided with two spaced apart, downwardly depending lugs 107 that are arranged alongside of the oval holes 165 and about where shown in FIG. 33; such lugs 107 are like the lugs 107 attached to the full shoe 73 (FIG. 10).

Figure 5:
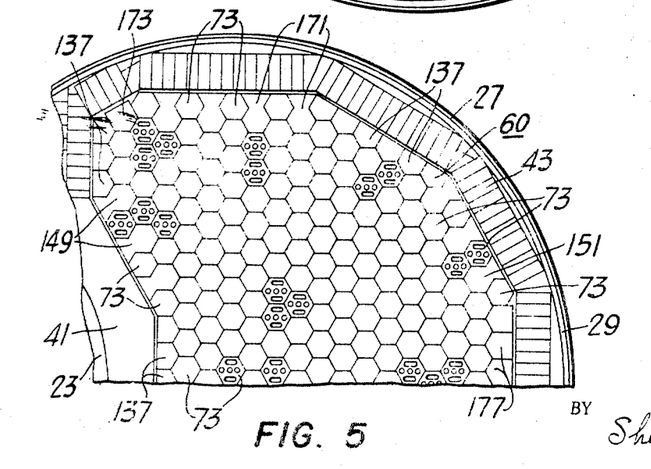
FIG. 5 is a schematic plan view along line V—V of FIG. 1, showing the arrangement of checker shoes.

Referring now to FIG. 1, it will be observed that the columns 45 support the girders 49 that support the grids 59. On top of the grids there is one course of the metallic shoes 61; FIG. 5 shows the arrangement of the several types of metallic shoes 61 in that course. All of the full hexagonal 73, and the edge shoes 173, 177, are so laid that the lugs 107 are on the underneath side of the checker shoe. Further, the long axis of the oval holes 143, 157, 165 in the checker shoes 61 are disposed normal to the longitudinal centerline of the supporting grid plates 65, and the long axes of the oval holes in the checker shoes are parallel to each other.

FIG. 6 is a plan view of the refractory checker bricks 62 in alternate, odd numbered courses.

Figure 7:
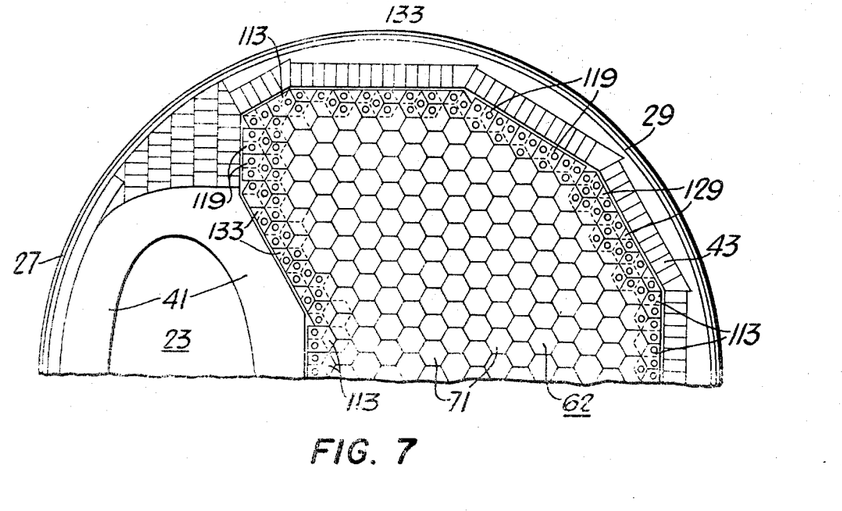
FIG. 7 is a schematic plan view of the checkerwork arrangement in alternate even numbered courses.

FIG. 7 is a plan view of the refractory checker bricks 62 in even numbered courses, laid intermediary of the odd numbered courses. Further, FIG. 7 illustrates how the checker bricks of the even numbered courses, which are shown in solid outline, overlap the checker bricks in the odd numbered courses (FIG. 6), which are shown by the dotted outlines. It will be evident from FIG. 7 that the holes in the bricks of the odd and even courses register, wherefore the holes form a plurality of vertical flues that extend from bottom to top of the checkerwork.

It will be evident to those skilled in the art that the lugs 107 on the shoes fit in the spaces 181 (FIG. 2) between the spaced apart vertical plates 65 of the grids 59 thereby locking the shoes in place relative to the grid structure.

A feature of the present invention is that each checker brick interlocks with every other checker brick to form an interlocking checker mass. Further, the greater percentage of the checker bricks are interlocked to six other checker bricks. The greater number of individual checker bricks are so arranged that each checker brick overlaps, and is interlocked with, three checker bricks in the course immediately below, and with three checker bricks in the course immediately above, a particular checker brick.

A feature of the invention is that a particular checker brick in any course, except the top course, cannot be displaced laterally in its course because of the mutual interconnection between the checker bricks in the courses above and below the particular checker brick. But, as to the bricks in the topmost course, they are interconnected each to three bricks in the next course below, and they are thereby prevented from shifting laterally.

A feature of the invention is that leaning of any portion of the checker mass is prevented, since the interlocking feature of the checker bricks creates practically a monolithic checker mass.

A feature of the invention is that the checker bricks of the first course interlock also with the checker shoes and thereby provide additional interconnection between the several units of the checker mass.

A feature of the invention is the grids which support the checker shoes and checker bricks. The grids provide a minimum restriction to the flow of gases through the supporting structure, and afford ample space for power-rodding of the aforementioned checker flues in the usual manner.

A feature of the invention is that the lugs on the checker shoes interlock with the grid, thereby minimizing the amount of lateral migration of the checker shoes and the checker brick mass.

A feature of the invention is that the interlocking lugs on the checker shoes permit an increase in the width of the gap between the checker bricks, whereby the present necessity for grinding the vertical surfaces of the checker bricks is eliminated.

A feature of the invention is that every flue in the checker mass is equidistant from adjacent flues whereby the checker brick mass is most uniformly distributed with respect to the flues. Hence, more efficient use of the heat capacity of the checker brick mass for heat transfer to the blast air results.

A feature of the invention is that the interlocking lugs provide an interlocked assembly of checker bricks even at the perimeter of the checkerwork mass, wherefore laying of ordinary refractory brick in the breast wall and profile wall can proceed quickly and without danger of damage to, or disturbance of, the checker brick mass.

While the invention has been described in connection with a two-pass type of stove, it will be understood by those skilled in the art that the invention is not limited to use in such stoves. The interlocking checkerbricks and shoes and supporting structure are applicable to stoves of the single-pass and triple-pass type as well.

Further, while the invention has been described with relation to vertically downwardly projecting lugs on the checkerbricks and shoes, those skilled in the art will recognize that the checkerbrick work and the shoes may be arranged with the lugs projecting upward. The arrangement, then, of the overlying checkerbricks and shoes would simply be inverted, with the lugs directed upward instead of downward.

While the invention has been described herein with a certain degree of particularity, it is to be understood that the disclosure has been made as an example and that the scope of the invention is defined by what is hereinafter claimed.

What is claimed is:

1. In a blast furnace stove having a checkerwork chamber, improved checker brick supporting structure comprising:
   (a) a plurality of spaced apart, parallel girders supported on spaced apart columns, each said girder including
      (i) a pair of spaced apart, parallel side members each having in cross section a larger vertical dimension than transverse thickness,
      (ii) spacing members connected to said side members at spaced apart locations for maintaining said members in selected parallel spaced apart relation and with
      (iii) members connected to the ends of said side members and arranged angularly thereto, said side angular members being disposed proximately to the perimeter of the interior wall of said checkerwork chamber; and
   (b) a plurality of grid structures arranged across said girders, each said grid structure comprising
      (i) a plurality of elongate, spaced apart parallel members that have in cross section a greater vertical dimension than transverse thickness,
      (ii) a plurality of spacers connected to said elongate members to maintain them in selected spaced apart relation, and with
      (iii) other members connecting the ends of the members of a grid and arranged proximately to the perimeter of the interior wall of said checkerwork chamber.

2. The invention of claim 1 wherein:
   (a) said parallel members are arranged in groups of two with the spacing between a pair of members being less than the spacing between groups of said members.

3. A checkerwork brick of hexagonal form having:
   (a) six vertical side surfaces and parallel top and bottom surfaces that are substantially perpendicular to the side surfaces,
   (b) said top and bottom surfaces being penetrated by a first cylindrical hole at the geometric center of said hexagonal form, and by three similar second cylindrical holes having centers located on a hole circle having a center at the geometric center of said hexagonal form, said second similar holes being located at the intersection of said hole circle and diagonal lines radiating from said geometric center to alternate apices of said hexagonal form, and by three third cylindrical holes having centers located on and spaced midway along the arc of said hole circle between said second holes, said three third cylindrical holes merging each with a recess having a larger diameter than said third hole in one surface of said top and bottom surfaces;
   (c) a lip surrounding each one of said third holes and raised above the other surface of said top and bottom surfaces, each said lip matching a respective one of said recesses in another one said checkerwork brick when two or more such bricks are assembled in stacked array; with
   (d) the six apices of said hexagonal shaped checkerwork brick being provided each with a one-third-hole cylindrical notch; and with
   (e) each of the six side surfaces being provided with a one-half-one cylindrical notch located substantially at the mid length point along each of said side surfaces.

4. A checkerwork brick of pentagonal form having:
   (a) five vertical side surfaces that are substantially perpendicular to parallel top and bottom surfaces, with
  (i) spaced apart first and second side surfaces being disposed perpendicularly to a third one of said side surfaces, with
  (ii) the fourth and fifth side surfaces mutually intersecting at an included angle of 120°, and with
  (iii) said first and fourth sides and said second and fifth sides intersecting mutually at included angles of 120°; said brick having
(b) a first hole through said brick having a center at the intersection of the bisectors of the angles between said first and fourth, and said second and fifth sides; and a second hole therethrough centered at the intersection of a hole circle, that is concentric with said first hole, and the line bisecting the angle between said fourth and fifth sides, and third and fourth holes therethrough having centers at the intersections of said hole circle and the lines bisecting the angles between said first and fourth sides and between said second and fifth sides, said third and fourth holes each merging with a recess having a greater cross section area than said third and fourth holes in one surface of said top and bottom surfaces;
(c) a lip surrounding each one of said third and fourth holes and raised above the surface of said other one of the top and bottom surfaces, each said lip matching a respective recess in another one of said checkerbricks when two of said checker bricks are placed in contiguous overlying position; and with
(d) said first, second, fourth and fifth sides of said brick having one-half-hole notches therein, and a one-third-hole notch at the apices formed by the intersecting first-fourth, second-fifth and fourth-fifth sides.

5. A checkerwork brick of pentagonal form having:
(a) five vertical side surfaces that are substantially perpendicular to parallel top and bottom surfaces, with
  (i) spaced apart first and second side surfaces being disposed perpendicularly to a third one of said side surfaces, with
  (ii) the fourth and fifth side surfaces mutually intersecting at an included angle of 120°, and with
(b) a first hole through said brick having a center at the intersection of the lines bisecting the angles between said first and fourth sides and said second and fifth sides, and having
(c) a plurality of groups of other holes through said brick,
  (i) a first group of said holes being disposed on a hole circle centered at said intersection, and with two of said holes centered at the intersections of said angle bisectors and said hole circle, and with a third such hole centered on said hole circle at the intersection of said hole circle and a line bisecting the angle between sides four and five and with the third such hole lying between said first hole and said first side,
  (ii) a second group of said holes being disposed on said hole circle at the mid point of the arcs of said hole circle connecting the centers of the holes in said first group of holes, the holes of said second group each merging with a recess of larger cross sectional area than said hole in one of said top and bottom surfaces;
(d) a lip surrounding each one of the holes of said second group that is raised above the surface of said other one of said top and bottom surfaces, each said lip matching a respective recess in another one of said checker bricks when two of said checker bricks are placed in contiguous overlying position; and with (e) said first, second, fourth and fifth sides of said brick having one-half-hole notches therein, and a one-third-hole notch at the apices formed by the intersecting first-fourth, second-fifth, and fourth-fifth sides; and with
(f) each of said first and said second sides having both a rectangular and one-fourth-circle-hole notch therein adjacent said first side.

6. A checkerwork brick having:
(a) four vertical side surfaces that are substantially perpendicular to parallel top and bottom surfaces, with
  (i) the first and second side surfaces being parallel and with each of the third and fourth surfaces intersecting said first surface at an included angle of 60° and intersecting said second surface at an included angle of 120°, with
(b) said second, third and fourth surfaces each having therein a one-half-hole notch, and with
(c) the apices formed by the intersecting first and third and first and fourth surfaces having a one-sixth-hole notch, and with
(d) the apices formed by the intersecting second and third and second and fourth surfaces having a one-third-hole-notch;
(e) said brick having a plurality of holes therethrough, with
  (i) a first hole being centered at the intersection of a hole circle that is centered at the mid length point of said first side and the bisector of the angle between said second and said third side; with
  (ii) a second hole being centered at the intersection of said hole circle and the bisector of the angle between said second and said fourth sides, said second hole merging with a recess having larger cross sectional area than said second hole in one of the top and bottom surfaces; and
(f) a lip surrounding said second hole and raised above the other one of the top and bottom surfaces, said lip matching a respective recess in another one of said checker bricks when two of said checker bricks are placed in contiguous overlaying position.

7. A checkerwork shoe of regular hexagonal form having:
(a) six vertical side surfaces that are substantially perpendicular to parallel top and bottom surfaces, said shoe having
  (i) a first hole therethrough situated at the geometric center of said hexagonal-form shoe, and
  (ii) a plurality of other holes through said shoe centered on a hole circle that is centered at the geometric center of said shoe including
    (1) a second hole through said shoe located at the intersection of said hole circle and the bisector of a first angle formed by two first intersecting side surfaces, and
    (2) a third hole through said shoe located at the intersection of said hole circle and the bisector of a second angle formed by two second intersecting side surfaces that are parallel respectively to said first side surfaces, and
    (3) a plurality of elongate holes having long axes that are parallel to each other and parallel to said bisectors, with
(b) said second hole merging into a recess in one surface of said top and bottom surfaces, and with
(c) a portion of the perimeter of said elongate holes each merging into a recess in said one surface and into a chamfer in said one surface;
(d) a plurality of lugs depending from the other surface of said top and bottom surfaces and located along side said elongate holes, with (e) each of said side surfaces having therein a half-hole notch, and
(f) with each of the apices of said hexagonal shoe having a one-third hole notch.

8. A checkerwork shoe of pentagonal shape having:
(a) five vertical side surfaces that are substantially perpendicular to parallel top and bottom surfaces, with
  (i) spaced apart first and second side surfaces being disposed perpendicularly to a third one of said side surfaces, with
  (ii) the fourth and fifth side surfaces mutually intersecting at an included angle of 120°, and with
(b) an opening therethrough of irregular shape having two arcuate portions with centers situated on a hole circle that is centered at the point of intersection of the bisectors of the angles between said first and fourth and said second and fifth sides, with
  (i) said arcuate portions merging each with a portion of a recess in one surface of said top and bottom surfaces having a greater radius than the radius of the respective arcuate portion with which said recess merges; and with
(c) said first, second, fourth and fifth sides of said brick having one-half-hole notches therein, and a one-third-hole notch at the apices formed by the intersecting first-fourth, second-fifth and fourth-fifth sides.

9. A checkerwork shoe having eight vertical side surfaces that are perpendicular to parallel top and bottom surfaces, said shoe including a regular hexagon portion integrally joined to a half-hexagon portion along equal length peripheral sides of said hexagon portion and said half-hexagon, with the longest side of said half-hexagon portion being parallel to the side that is joined to said full hexagon portion, with
(a) each of the three shorter sides of said half-hexagonal portion and the six sides of said regular hexagonal portion having therein a half-hole notch, and with
(b) each of the apices at the corners of said full hexagonal portion having a one-third-hole notch, and with
(c) each of the apices at the corners of the half-hexagonal portion nearest the full hexagonal portion having a one-third-hole notch, and with
(d) each of the other two apices of the half-hexagon portion having a one-sixth-hole notch, with
(e) the half-hole notch in the common abutting surfaces of said half-hexagon portion and said full hexagon portion being complementary to form a full cylindrical hole through said shoe,
(f) said half-hexagon portion having an elongate hole therethrough having its long axis parallel to the longest side of said half-hexagon portion, and with said elongate hole merging with portions of recesses in both the top and bottom surfaces of said shoe, said recess portions being greater in cross sectional area than the hole portion they merge with,
(g) said full hexagonal shoe portion having therethrough a plurality of holes including
  (i) a first cylindrical hole being located in the geometric center of said hexagon portion, and
  (ii) a pair of other second holes centered at locations spaced 180° apart on a hole circle concentric with said first hole at the intersection thereof with a diagonal of said full-hexagonal portion that is also the diameter of said first circular hole that lies in the second and fourth quadrants thereof, said second holes merging each with recesses in both the top and bottom surfaces of said shoe, and
  (iii) a plurality of elongate holes disposed with the long axes on opposite sides of said in parallel to said diagonal, each said elongate hole merging with recesses in both the top and bottom surfaces of said shoe.

10. A checkerwork shoe having eight vertical side surfaces that are perpendicular to parallel top and bottom surfaces, said shoe including a regular hexagon portion integrally joined to a half-hexagon portion along equal length peripheral sides of said hexagon portion and said half-hexagon, with the longest side of said half-hexagon portion being parallel to the side that is joined to said full hexagon portion with
(a) each of the three shorter sides of said half-hexagonal portion and the six sides of said regular hexagonal portion having therein a half-hole notch, and with
(b) each of the apices at the corners of said full hexagonal portion having a one-third-hole notch, and with
(c) each of the apices at the corners of the half-hexagonal portion nearest the full hexagonal portion having a one-third-hole notch, and with
(d) each of the other two apices of the half-hexagon portion having a one-sixth-hole notch, with
(e) the half-hole notch in the common abutting surfaces of said half-hexagon portion and said full hexagon portion being complementary to form a full cylindrical hole through said shoe,
(f) said half-hexagonal portion having an elongate hole therethrough that has its long axis parallel to the longest side surface of said half-hexagonal portion and with said elongate hole merging with recesses in both the top and the bottom surfaces of said shoe;
(g) said full hexagonal shoe portion having therethrough a plurality of holes including
  (i) a first cylindrical hole being located at the geometric center of said hexagon portion, and
  (ii) a similar second cylindrical hole being centered at the intersection of a hole circle, that is concentric with said first hole, and a diagonal through opposite apices that is parallel to the common side between said half and said full hexagon portions, and
  (iii) a third cylindrical hole centered at the intersection of said diagonal and said hole circle, but removed 180° from the second hole on said hole circle, said third hole merging with a recess in each of said top and bottom surfaces, and
  (iv) a plurality of elongate holes disposed with the long axes on opposite sides and parallel to said diagonal, with the adjacent ends of said elongate holes merging into recesses in both the top and bottom surfaces.

11. A checkerwork shoe of pentagonal form having:
(a) five vertical side surfaces that are substantially perpendicular to parallel top and bottom surfaces, with
  (i) spaced apare first and second side surfaces being disposed perpendicularly to a third one of said side surfaces, with
  (ii) the fourth and fifth side surfaces mutually intersecting at an included angle of 120°, said shoe having
(b) a first hole through said shoe having a center at the intersection of the bisectors of the angles between said first and fourth, and said second and fifth sides, and
(c) a second hole through said shoe centered at the intersection of a hole circle that is concentric with said first hole, and the bisector of the angle between said first and fourth sides, and
(d) a third hole centered on said hole circle, but at a location 180° from the location of said second hole, said third hole merging with recesses in both the top and bottom surfaces which are larger in cross sectional area than said third hole, and
(e) a plurality of fourth elongate holes through said shoe located on opposite sides of the bisector of the angle between said first and fourth sides, the end portion of each said elongate hole merging with recesses in both the top and bottom surfaces that are larger in cross sectional area than the adjacent portion of the elongate hole, and (f) said first, second, fourth and fifth sides of said brick having one-half-hole notches therein, and a one-third-hole notch at the apices formed by the intersecting first-fourth, second-fifth and fourth-fifth sides.

12. The invention set forth in claim 10 wherein
(a) the arrangement of said first, second, third and fourth holes are parallel to each other and parallel to the unnotched side surface of said half-shoe portion.

13. A checerwork construction for blast furnace stoves and the like comprising:
(a) a first course of cooperative metallic shoe including
  (i) a plurality of shoes as defined in claim 7,
  (ii) a plurality of shoes as defined in claim 8,
  (iii) a plurality of shoes as defined in claim 9,
  (iv) a plurality of shoes as defined in claim 10,
  (v) a plurality of shoes as defined in claim 11,
  (vi) a plurality of shoes as defined in claim 12,
with a plurality of the shoes as defined in claim 7 disposed contiguously with other such shoes and with shoes as defined in claims 8–12, all of said shoes being so disposed that the elongate holes thereof are substantially parallel;
(b) a plurality of courses of checkerwork bricks arranged on said shoes and cooperative with each other to form a checkerwork brick mass, each of said courses of bricks including
  (i) a plurality of bricks as defined in claim 3,
  (ii) a plurality of bricks as defined in claim 4,
  (iii) a plurality of bricks as defined in claim 5,
  (iv) a plurality of bricks as defined in claim 6,
with the depending lugs of the checkerwork bricks in a first course that is contiguous with said shoes being cooperative with respective recesses in said shoes, and with the depending lugs of the checkerwork bricks in the other courses being cooperative with respective recesses in the checkerwork bricks of a course immediately below said each other course and with said bricks and shoes being so arranged that the openings in said bricks and shoes and the notches therein form vertically aligned flues extending from the bottom to the top of said checkerwork construction.

14. In a blast furnace stove wherein a mass of checkerwork shoes and bricks are supported on columns, the improvements comprising:
(a) a plurality of girders supported on said columns each said girder comprising
  (i) a pair of spaced apart, parallel members with means maintaining said members in parallel, spaced apart relation, and
  (ii) a member disposed biasedly across the ends of said girders and arranged substantially parallel to a linear portion of the perimeter of said mass of checkerwork shoes and bricks; and
(b) a plurality of grid structures laid over said girders and on which said checkerwork shoes and bricks are laid, said grid structures including
  (i) a plurality of pairs of elongate, spaced apart parallel members with means maintaining each pair of members in spaced apart relation and with means maintaining a plurality of said pairs of members in spaced apart relation, the spacing of said pairs of members being greater than the spacing of said members of a pair.

15. A blast furnace stove comprising:
(a) a shell mounted upon a base and subdivided internally into a combustion chamber and a checkerwork chamber;
(b) a plurality of columns fixed to said base in said checkerwork chamber;
(c) a plurality of girders supported on said columns, each girder comprising:
  (i) a pair of spaced apart, parallel members with means maintaining said members in parallel, spaced apart relation, and
  (ii) a member disposed biasedly across the ends of said girders and arranged substantially parallel to a linear portion of the perimeter of a mass of checkerwork shoes and bricks disposed in said checkerwork chamber; and
(d) a plurality of grid structures laid upon and disposed substantially normal to said girders, each said grid structure comprising
  (i) a plurality of pairs of elongate, spaced apart parallel members with means maintaining each pair of members in spaced apart relation and with means maintaining a plurality of said pairs of members in spaced apart relation, the spacing of said pairs of members being greater than the spacing of said members of a pair;
(e) a plurality of metallic shoes having differing shapes that are mutually cooperative and are arranged as a first level course on and cooperating with said grid structure, said shoes including a plurality of the shoes defined in each of claims 8, 9, 10, 11 and 12, with the downward projecting lugs of said shoes fitting in the space between the pair of members forming a portion of said grid, said shoes being so arranged that the elongate holes therein have parallel axes that are normal to the elongate members of the grid strutcures; and
(f) a plurality of mutually cooperative checkerwork bricks of differing shapes laid in courses upon said metallic shoes, each course containing a plurality of the checkerwork bricks as defined in claims 3, 4, 5 and 6, with said checkerwork bricks in each alternate course being arranged in a first manner, and with the checkerwork bricks in each intermediary course being arranged in a second manner, said checkerwork bricks being so arranged in all courses that the holes and notches therein match with the holes and notches in said shoes and form a plurality of vertical flues extending from the bottom to the top of the checkerwork mass in said stove.

References Cited

UNITED STATES PATENTS

| | | | |
|---|---|---|---|
| 1,916,458 | 7/1933 | Bigelow | 263—51 |
| 2,166,375 | 7/1939 | Schwarze | 263—51 |

EDWARD G. FAVORS, Primary Examiner

U.S. Cl. X.R.

263—51

PO-1050
(5/69)

UNITED STATES PATENT OFFICE
CERTIFICATE OF CORRECTION

Patent No. 3,488,041     Dated January 6, 1970

Inventor(s) Russell A. Powell and Jack Hyde

It is certified that error appears in the above-identified patent and that said Letters Patent are hereby corrected as shown below:

Claim 3, line 71, change "one-half-one", to ---one-half-hole---

Claim 13, line 16, change "checerwork", to ---checkerwork---

SIGNED AND
SEALED
FEB 2 1971

(SEAL)
Attest:

Edward M. Fletcher, Jr.
Attesting Officer

WILLIAM E. SCHUYLER, JR.
Commissioner of Patents